(12) United States Patent
McQuade

(10) Patent No.: US 6,640,559 B1
(45) Date of Patent: Nov. 4, 2003

(54) VERTICAL OIL SEPARATOR FOR A CHILLER SYSTEM

(75) Inventor: William F. McQuade, New Cumberland, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 10/119,715

(22) Filed: Apr. 11, 2002

(51) Int. Cl.[7] ............................................. F25B 43/02
(52) U.S. Cl. ..................................... 62/84; 62/470
(58) Field of Search ................... 62/84, 468, 470, 62/503, 512

(56) References Cited

U.S. PATENT DOCUMENTS

| 4,253,954 A | * | 3/1981 | Midkiff et al. ............... 210/168 |
| 4,364,833 A | * | 12/1982 | Loegering ..................... 210/521 |
| 4,472,949 A | | 9/1984 | Fujisawa et al. ............... 62/473 |
| 5,029,448 A | | 7/1991 | Carey .............................. 62/84 |
| 5,086,621 A | | 2/1992 | Starner et al. ................... 62/84 |
| 5,113,671 A | | 5/1992 | Westermeyer ................. 62/468 |
| 5,170,640 A | * | 12/1992 | Heitmann et al. ............. 62/470 |
| 5,242,475 A | | 9/1993 | Stine et al. .................... 55/319 |
| 5,271,245 A | * | 12/1993 | Westermeyer ................. 62/470 |
| 5,404,730 A | * | 4/1995 | Westermeyer ................. 62/470 |
| 5,704,215 A | | 1/1998 | Lord et al. ....................... 62/84 |
| 6,131,405 A | * | 10/2000 | Griffin et al. .................. 62/470 |

FOREIGN PATENT DOCUMENTS

WO    WO 97/38781    * 10/1997

* cited by examiner

Primary Examiner—Melvin Jones
(74) Attorney, Agent, or Firm—Finnegan, Henderson, Farabow, Garrett & Dunner, L.L.P.

(57) ABSTRACT

A device and method is provided for separating oil from an oil and gas mixture in a chiller system. The device includes a housing, an oil and gas inlet, a gas outlet, an oil outlet, a baffle, and a coalescing assembly to separate the oil from the oil and gas mixture. The method includes tangentially introducing the oil and gas mixture into a housing, separating the oil from the mixture by centrifugal force, separating the oil from the mixture by changing a flow direction of the mixture in the housing, discharging the gas from the housing, and discharging the oil separated from the oil and gas mixture from the housing. The device and method provides excellent oil separation performance. The device and method is also cost effective, compact in size, and compatible to the existing chiller system design, and can be readily manufactured.

32 Claims, 4 Drawing Sheets

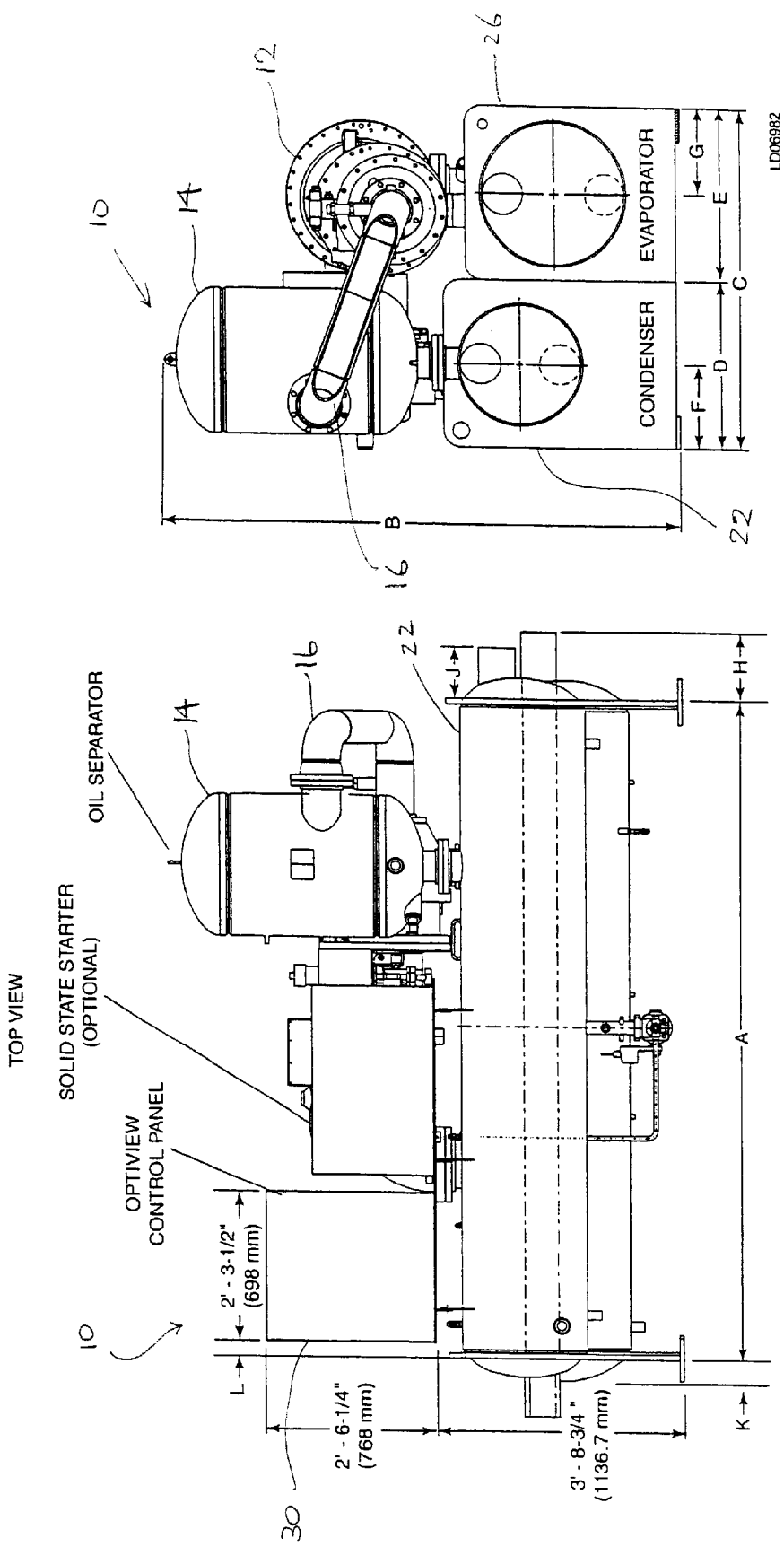

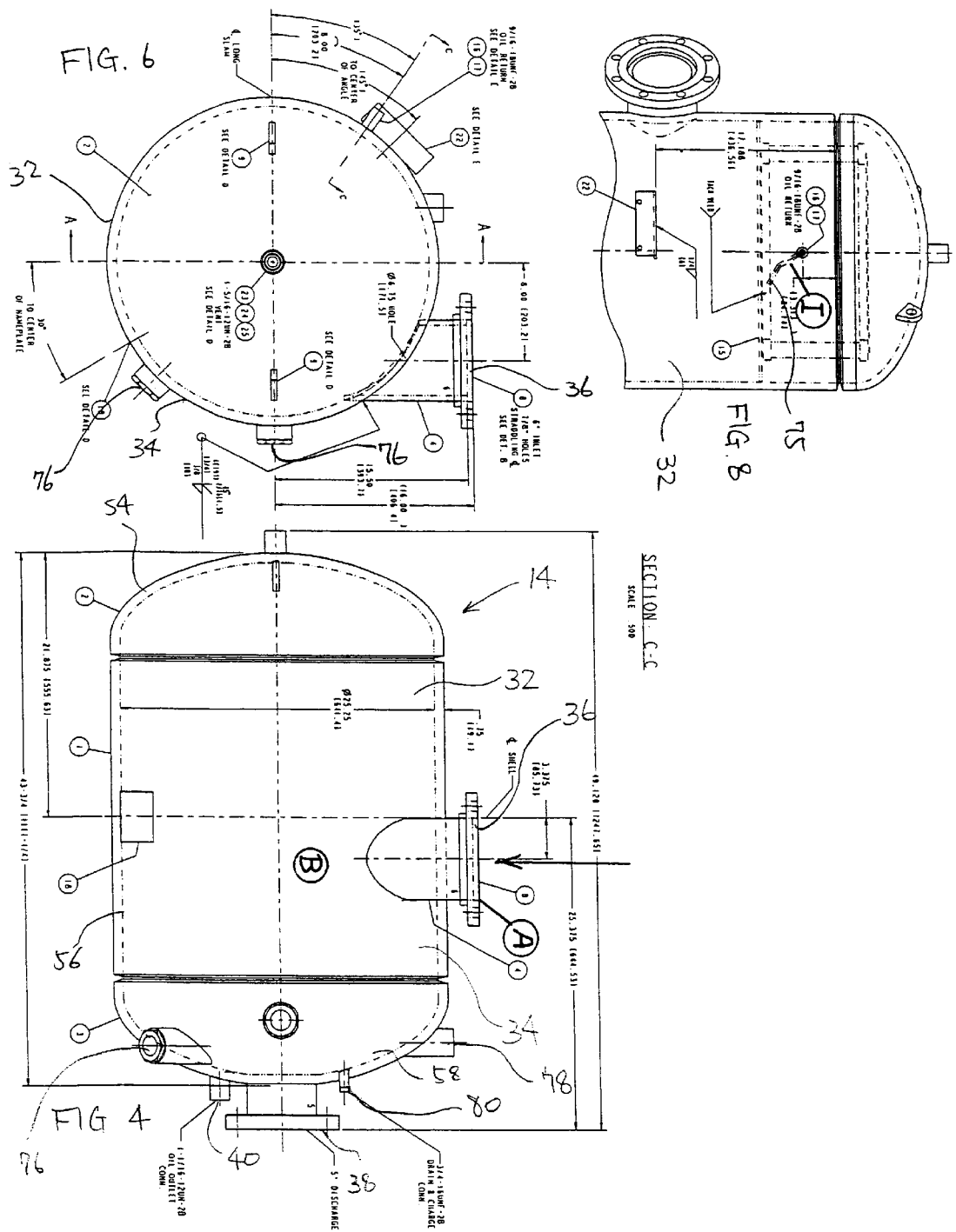

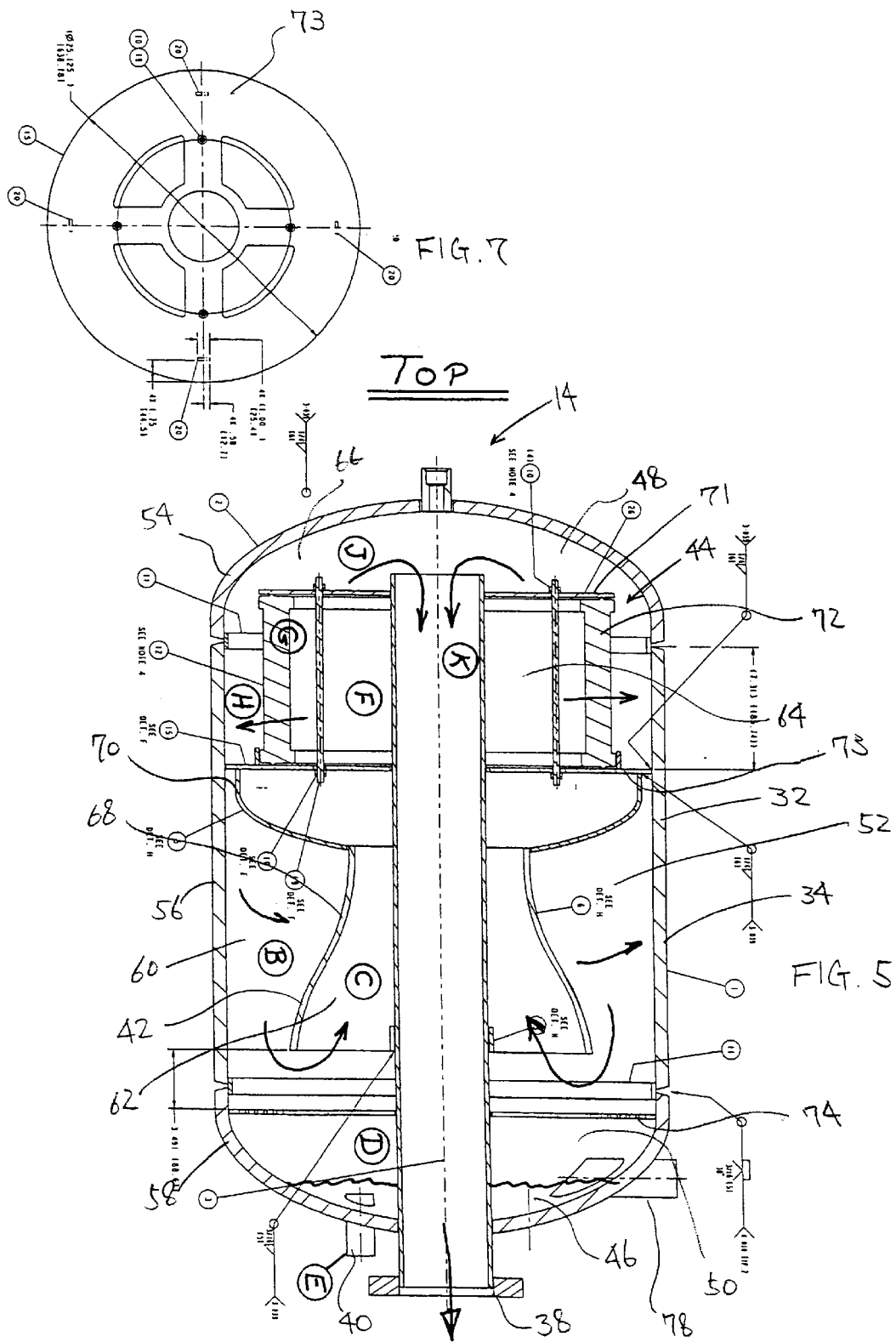

VERTICAL OIL SEPARATOR FOR A CHILLER SYSTEM

DESCRIPTION OF THE INVENTION

1. Field of the Invention

The present invention relates to an oil separator for separating oil from an oil and refrigerant gas mixture in a chiller system. More particularly, the invention is directed to a vertical oil separator having a baffle for separating oil from an oil and refrigerant gas mixture in a chiller system.

2. Background of the Invention

In general, a refrigeration or chiller system has a compressor to compress a refrigerant gas, a condenser to condense the compressed gas to a refrigerant liquid by cooling the gas, an expansion valve to reduce pressure of the refrigerant liquid, and an evaporator for absorbing heat from a fluid to provide a chilled liquid for refrigeration of a desired area. There are various types of compressors used in a chiller system. For example, screw, reciprocating, centrifugal, or scroll compressors are well known in a chiller system.

Typically, a compressor uses oil to lubricate and provide better sealing performance in the compressor. Inevitably, the oil used in the compressor becomes mixed with the refrigerant gas, and the mixture of the oil and refrigerant gas is carried from the compressor to the condenser and to the evaporator.

However, oil does not have as good heat transfer capability as refrigerant, and the oil traveled into the condenser and the evaporator reduces the efficiency of the chiller system.

Furthermore, if the oil traveled from the compressor to the other parts of the chiller is not returned to the compressor, more oil needs to be added to the chiller system to maintain the compressor performance, or the lack of oil causes the compressor to fail. Typically, in a screw compressor, several gallons of oil per minute are required to circulate with the compressed refrigerant gas in the compressor to lubricate and seal compressor rotors.

In an effort to alleviate the above problems, it is known to provide an oil separator between the compressor and condenser in a chiller system. An oil separator basically separates oil from an oil and refrigerant gas mixture from the compressor, discharges the refrigerant gas to the condenser, and returns the separated oil to the compressor.

Various oil separators are known for separating oil from an oil and refrigerant gas mixture. However, many oil separators suffer from deficiency in performance, manufacturing cost, size, and compatibility to the existing chiller system.

Thus, it is desirable to provide an oil separator that provides excellent oil separation performance, that is cost effective, compact in size, and compatible to the existing chiller system design, and that can be readily manufactured. The present invention is directed to solving one or more of the shortcomings associated with prior art designs.

SUMMARY OF THE INVENTION

In accordance with the invention, a device is provided for separating oil from an oil and gas mixture in a chiller system. The device includes a housing having a peripheral wall, an oil and gas inlet, a gas outlet, and an oil outlet. The device also includes a baffle defining a first chamber and a second chamber within the housing, the first chamber being in fluid communication with the oil and gas inlet, and a coalescing assembly defining a third chamber and a fourth chamber within the housing, the fourth chamber being in fluid communication with the gas outlet. The device, further, includes an oil sump portion disposed within the housing, the oil sump portion being in fluid communication with the oil outlet.

In another aspect, a device for separating oil from an oil and gas mixture in a chiller system, includes a housing having a peripheral wall surrounding a top chamber, a bottom chamber, and an intermediate chamber between the top and bottom chambers. The device also includes an oil and gas inlet attached tangentially to the housing to impart a swirling motion to the oil and gas mixture in the intermediate chamber, a gas outlet extending from the top chamber through the housing to discharge the gas in the top chamber outside the housing, an oil outlet in fluid communication with the bottom chamber, and a baffle disposed in the intermediate portion, the baffle having a baffle wall to separate the oil from the oil and gas mixture by forcing a flow direction of the oil and gas mixture to change in the intermediate portion.

In another aspect of the invention, a method is provided for separating oil from an oil and gas mixture in a chiller system. The method includes tangentially introducing the oil and gas mixture into a housing, separating the oil from the mixture by centrifugal force, separating the oil from the mixture by changing a flow direction of the mixture in the housing, discharging the gas from the housing, and discharging the oil separated from the oil and gas mixture from the housing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

FIG. 2 is a side view of a chiller system having an oil separator according to one embodiment of the invention;

FIG. 3 is an end view of the chiller system shown in FIG. 2;

FIG. 4 is a side view of an oil separator according to one exemplary embodiment of the invention;

FIG. 5 is a cross-sectional view of the oil separator shown in FIG. 4;

FIG. 6 is a top plan view of the oil separator shown in FIG. 4;

FIG. 7 is a top plan view of a portion of a coalescing assembly of the oil separator of FIG. 5; and FIG. 8 is a partial side view of the oil separator according to one exemplary embodiment of the invention.

DESCRIPTION OF THE EMBODIMENTS

Figure 1:
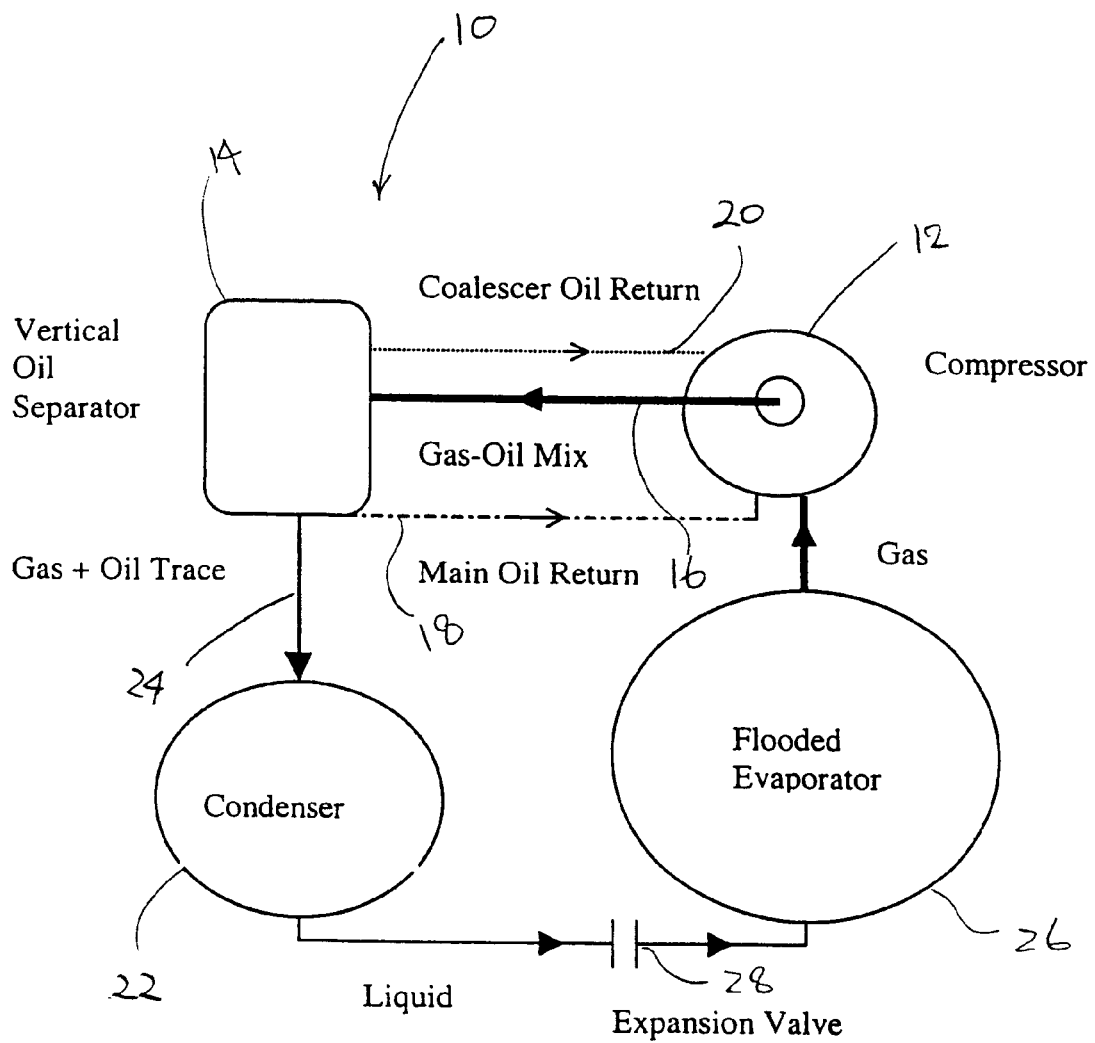
FIG. 1 is a schematic representation of a chiller system having an oil separator according to one embodiment of the present invention.

Reference will now be made in detail to exemplary embodiments of the invention, which are illustrated in the accompanying drawings. Wherever possible, the same reference numbers will be used throughout the drawings to refer to the same or like parts.

As illustrated in the schematic diagram of FIG. 1, a chiller system 10 includes a compressor 12 in fluid communication with an oil separator 14 via a conduit 16. An oil and refrigerant gas mixture travels from the compressor 12 to the oil separator 14. Typically, the oil content in the oil and gas mixture from a compressor in a chiller system is over 50,000 ppm (parts per million). The compressor 12 is also in fluid communication with the oil separator 14 via a main oil return line 18 and a secondary or coalescer oil return line 20. A condenser 22 is provided in fluid communication with the oil separator by a conduit 24. The refrigerant gas and an acceptable amount of oil travel from the oil separator 14 to the condenser 22. At the condenser 22, the refrigerant gas is cooled and condensed into a refrigerant liquid, which is in turn transmitted to an evaporator 26 through an expansion valve 28. At the evaporator 26, heat transfer takes place between the refrigerant liquid and a chilled liquid to provide desired refrigeration. The refrigerant liquid in the evaporator 26 turns into a refrigerant gas by absorbing heat from the chilled liquid and returns to the compressor 12. This refrigeration cycle continues when the chiller system 10 is in operation.

FIGS. 2 and 3 illustrate the chiller system 10 having the compressor 12, the oil separator 14, the condenser 22, and the evaporator 26. The chiller system 10 may have a control unit 30 to control the operation of the chiller system 10. In this exemplary embodiment, the compressor 12 is a screw type compressor in fluid communication with the oil separator 14 by the conduit 16, and the oil separator 14 is a vertically oriented oil separator that can be directly mounted onto the condenser thereby eliminating the need for a conduit between them.

As shown in FIGS. 4 and 5, the oil separator 14 includes a housing 32 having a peripheral wall or shell 34, an oil and gas inlet 36, a gas outlet 38, and a main oil outlet 40. The oil separator 14 also includes a baffle 42, a coalescing assembly 44, and an oil sump portion 46.

The housing 32 hermetically seals off the inside of the oil separator 14, and the peripheral wall 34 can be made of a steel or other suitable material. The peripheral wall 34 has a suitable thickness that may vary to meet noise tolerance of the oil separator.

In the exemplary embodiment shown in FIG. 5, the inside of the housing 32 is separated into a top chamber 48, a bottom chamber 50, and an intermediate chamber 52 between the top and bottom chambers. The intermediate chamber 52 is further divided into first and second chambers 60, 62, respectively, by the baffle 42, and the top chamber 48 is further divided into third and fourth chambers 64, 66, respectively, by the coalescing assembly 44. FIG. 5 includes arrows to generally indicate the flow path of the oil and gas mixture within the oil separator 14.

The peripheral wall 34 of the housing 32 may have a top wall portion 54, an intermediate wall portion 56, and a bottom wall portion 58. The wall portions may be welded together or assembled by any other suitable method.

As illustrated in FIGS. 4 and 6, the oil and gas inlet 36 is disposed tangentially to the intermediate wall portion 56 of the housing 32 to impart a swirling motion to the oil and gas mixture in the first chamber 60. In FIG. 6, for example, the oil and gas mixture from the compressor 12 is introduced into the first chamber 60 of the housing 32 by swirling in the clockwise direction due to the tangential placement of the oil and gas inlet 36 to the housing 32. The swirling motion of the oil and gas mixture separates the oil from the mixture in the first chamber 60 as described below.

The oil has a larger density than the refrigerant gas, and the velocity of the oil and gas mixture is slower near the peripheral wall 34 than toward the center. Thus, the swirling motion of the oil and gas mixture causes the oil to move radially outwardly to the peripheral wall 34 by centrifugal force and to adhere to the peripheral wall 34 by surface tension. The oil adhered to the peripheral wall 34 then drops down by the gravity and is accumulated in the oil sump portion 46. In one embodiment, the oil separator 14 may include a screen or mesh member at the inner surface of the peripheral wall 34 to facilitate adhesion of the oil.

As shown in FIG. 5, the baffle 42 is disposed in the intermediate chamber 52 and defines the first and second chambers 60, 62 in the intermediate chamber 52 of the housing 32. The first chamber 60 is in fluid communication with the oil and gas inlet 36 and the second chamber 62. The baffle may be slid onto the gas outlet 38 by support braces (not shown in figures). In one exemplary embodiment, the baffle 42 may be concentric with the peripheral wall 32 and have a baffle wall that accelerates a flow of the oil and gas mixture in the first chamber 60. In the embodiment shown in FIG. 5, the baffle 42 has a venturi shape with a constriction portion 68 and an expansion portion 70. This baffle wall shape effectively reduces the horizontal cross-sectional flow area of the first chamber 60 as the oil and gas mixture passes through the first chamber 60, and accelerates the oil and gas mixture flow in the first chamber 60. The baffle 42 in this embodiment may also referred to as a concentric reducer.

As the oil and gas mixture travels from the first chamber 60 to the second chamber 62, the baffle 42 forces the flow direction of the mixture to change. As indicated by arrows in FIG. 5, the oil and gas mixture flows from the first chamber to the second chamber by abruptly changing its flow direction, i.e., the downward to upward direction (180° turn), in a U-shaped curve. This abrupt change in the flow direction subjects the oil remaining in the oil and gas mixture to a further separation process. Because the oil and gas mixture is accelerated by the baffle 42 to a faster flow speed and is forced to abruptly change its flow direction, the oil cannot completely overcome its downward momentum as the gas and only fine oil droplets make the turn and continue to travel into the second chamber 62. As a result, the oil that cannot overcome the downward momentum drops down to the oil sump portion 46. Moreover, some oil droplets that travel upwardly in the second chamber may not have enough momentum to resist the gravitational force and drop down to the oil sump portion 46.

As shown in FIGS. 4 and 5, the oil sump portion 46 is disposed within the housing 32 and in fluid communication with the oil outlet 40. The oil separator 14 may also include a perforated oil drainer 74 that separates the oil sump portion 46 from the first and second chambers 60, 62. The perforation of the oil drainer 74 may be located only its outer peripheral area directly below the first chamber 60 so that the oil accumulated in the oil sump portion 46 is not accidentally carried into the second chamber 62 by the gas flow. In another embodiment, the oil drainer 74 may have a conical shape to promote draining of the oil into the oil sump portion 46. The oil accumulated in the oil sump portion 46 is discharged from the housing 32 through the oil outlet 40 and returned to the compressor 12 via the main oil return line 20. Due to high pressure in the oil separator 14, the oil in the oil sump portion 46 is automatically discharged outside of the oil separator 14.

In one exemplary embodiment, the oil separator 14 has a sight glass 76 at the bottom wall portion 58 for an operator to see the oil level in the oil sump portion 46. A plurality of sight glasses may be used to see the oil at different levels. Furthermore, the oil separator may include a heater 78 at the bottom wall portion 58 for heating the oil when the chiller system 10 is off to avoid the refrigerant to be absorbed in the accumulated oil. The heater 78 may be an electrical emersion heater.

The gas with remaining trace quantities of oil travels through the second chamber 62 proximate to the constriction and expansion portions 68, 70 of the baffle 42. In the second chamber proximate to the expansion portion 70, the mixture flow decelerates because its cross-sectional area is larger than that of the second chamber proximate to the constriction portion 78. This deceleration of the mixture to a slower flow speed helps the coalescing assembly to filter the remaining oil in the mixture as described below.

As shown in FIG. 5, the mixture travels from the intermediate chamber 52 to the top chamber 48 of the housing 32. The oil separator has the coalescing assembly 44 that defines the third and fourth chambers 64, 66. The fourth chamber 44 is in fluid communication with the gas outlet 38.

The coalescing assembly 44 shown in FIG. 5 includes a top disc 71 and a bottom disc 73 having flow openings. FIG. 7 illustrates one embodiment of the bottom disc 73 in detail. The gas travels from the second chamber 62 to the third chamber 64 through the flow openings of the bottom disc 73. A coalescing element 72 is secured in place between the top and bottom discs 71, 73 by a bolt or any other suitable method, and the coalescing element 72 captures the remaining trace of oil as the gas travels through the coalescing element 72 from the third chamber 64 to the fourth chamber 66. The coalescing element 72 may be made of fiberglass, filer paper, or other suitable material. A steel mesh may be provided to the coalescing element 72 for support.

The trace of oil collected by the coalescing assembly 44 is drained and accumulated in the bottom of the fourth chamber 66 due to the flow direction of the gas. As shown in FIG. 8, the oil is discharged outside of the housing 32 through the second oil outlet 75 in fluid communication with the fourth chamber 66 and returned to the compressor 12 via the secondary oil return line 20. The oil accumulated in the fourth chamber 66 is automatically discharged from the oil separator 14 due to high pressure in the housing 32.

In the fourth chamber 66, the gas includes acceptable trace quantities of oil to be discharged from the oil separator 14 to the condenser 22. In one exemplary embodiment, the oil quantities may be less than 400 ppm. The gas is then discharged from the fourth chamber 66 through the gas outlet 38. As shown in the exemplary embodiment in FIG. 5, the gas outlet 38 is disposed in the housing 32 and through the peripheral wall 34 and being integrally formed with the housing 32. The gas outlet 38 extends from the fourth chamber 66 through the intermediate chamber 52, the bottom chamber 50, and the peripheral wall 34 to discharge the gas outside of the housing 32. Because the gas outlet 38 is internally disposed in the housing 32 or is integrally formed with the housing 32 in this exemplary embodiment, it is unnecessary to provide a lengthy external conduit to discharge the gas from the oil separator 14 to the condenser 22.

Additionally, as illustrated in FIG. 4, the oil separator 14 may include an oil drain and charge port 80 at the bottom portion 58 to drain or replenish oil in the chiller system 10 as needed.

It will be apparent to those skilled in the art that various modifications and variations can be made in the device and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for separating oil from an oil and gas mixture in a chiller system, comprising:
    a housing having a peripheral wall, an oil and gas inlet, a gas outlet, and an oil outlet;
    a baffle defining a first chamber and a second chamber within the housing, the first chamber being in fluid communication with the oil and gas inlet;
    a coalescing assembly defining a third chamber and a fourth chamber within the housing, the fourth chamber being in fluid communication with the gas outlet; and
    an oil sump portion disposed within the housing, the oil sump portion being in fluid communication with the oil outlet.

2. The device of claim 1, wherein the oil and gas inlet is disposed tangentially to the peripheral wall of the housing to impart a swirling motion to the oil and gas mixture in the first chamber.

3. The device of claim 1, wherein the peripheral wall of the housing has a screen member at an inner surface for adhesion of the oil.

4. The device of claim 1, wherein the baffle has a baffle wall that accelerates the oil and gas mixture in the first chamber and forces a flow direction of the mixture to change from the first chamber to the second chamber.

5. The device of claim 4, wherein the baffle wall has a venturi shape with a constriction portion and an expansion portion.

6. The device of claim 5, wherein the baffle is concentric with the peripheral wall.

7. The device of claim 1, wherein the coalescing assembly has a coalescing element for capturing the oil.

8. The device of claim 1, wherein the gas outlet is internally disposed in the housing and through the peripheral wall.

9. The device of claim 1, wherein the gas outlet extends from the fourth chamber through the housing to discharge the gas from the fourth chamber out of the housing.

10. The device of claim 9, wherein the gas outlet is concentric with the peripheral wall.

11. The device of claim 1, wherein the oil sump portion is separated from the first and second chambers by a perforated oil drainer.

12. The device of claim 1, further including a second oil outlet in fluid communication with the fourth chamber.

13. A device for separating oil from an oil and gas mixture in a chiller system, comprising:
    a housing having a peripheral wall surrounding a top chamber, a bottom chamber, and an intermediate chamber between the top and bottom chambers;
    an oil and gas inlet attached tangentially to the housing to impart a swirling motion to the oil and gas mixture in the intermediate chamber;
    a gas outlet extending from the top chamber through the housing to discharge the gas in the top chamber outside the housing;
    an oil outlet in fluid communication with the bottom chamber; and
    a baffle disposed in the intermediate portion, the baffle having a baffle wall to separate the oil from the oil and gas mixture by forcing a flow direction of the oil and gas mixture to change in the intermediate portion.

14. The device of claim 13, wherein the peripheral wall of the housing has a screen member at an inner surface for adhesion of the oil separated from the oil and gas mixture by the swirling motion in the intermediate chamber.

15. The device of claim 13, wherein the baffle separates the intermediate chamber into a first chamber and a second chamber in fluid communication with each other.

16. The device of claim 15, wherein the baffle wall accelerates a flow of the oil and gas mixture in the first chamber.

17. The device of claim 16, wherein the baffle wall has a venturi shape with a constriction portion and an expansion portion.

18. The device of claim 15, wherein the baffle is concentric with the peripheral wall and the first chamber is defined by the baffle wall and the peripheral wall.

19. The device of claim 13, wherein the gas outlet is internally disposed in the housing and through the peripheral wall.

20. The device of claim 13, wherein the gas outlet extends through the intermediate chamber, the bottom chamber, and the peripheral wall of the housing.

21. The device of claim 19, wherein the gas outlet is concentric with the peripheral wall.

22. The device of claim 13, further including a coalescing assembly in the top chamber, the coalescing assembly having a coalescing element for capturing the oil.

23. The device of claim 13, further including a second oil outlet in fluid communication with the top chamber.

24. A method for separating oil from an oil and gas mixture in a chiller system, comprising:

tangentially introducing the oil and gas mixture into a housing;

separating the oil from the mixture by centrifugal force;

separating the oil from the mixture by changing a flow direction of the mixture in the housing;

discharging the gas from the housing; and discharging the oil separated from the oil and gas mixture from the housing.

25. The method of claim 24, wherein the tangential introduction of the oil and gas mixture into the housing imparts a swirling motion to the mixture in the housing.

26. The method of claim 24, wherein the oil separated by the centrifugal force adheres to a peripheral wall of the housing.

27. The method of claim 24, wherein the flow direction of the mixture is changed by a baffle in the housing.

28. The method of claim 27, wherein the flow direction of the mixture is changed in a U-shaped curve.

29. The method of claim 27, further including accelerating the flow of the mixture in the housing by the baffle prior to the separation of the oil from the mixture by changing the flow direction of the mixture.

30. The method of claim 24, further including accumulating the separated oil in the housing.

31. The method of claim 24, further including coalescing the oil in the housing.

32. The method of claim 31, further including discharging the coalesced oil from the housing.

* * * * *